(12) United States Patent
Yamagata et al.

(10) Patent No.: US 7,189,365 B1
(45) Date of Patent: Mar. 13, 2007

(54) LIQUID TREATING EQUIPMENT INCLUDING A STORAGE VESSEL AND A DISCHARGE VESSEL

(75) Inventors: Yutaka Yamagata, Wako (JP); Tsunehiko Ozaki, Wako (JP); Victor Morozov, Pushchino (RU); Kozo Inoue, Tokyo (JP)

(73) Assignees: Riken, Wako (JP); Fuence Co., Ltd., Tokyo (JP)

( * ) Notice: Subject to any disclaimer, the term of this patent is extended or adjusted under 35 U.S.C. 154(b) by 0 days.

(21) Appl. No.: 09/674,304

(22) PCT Filed: Mar. 3, 2000

(86) PCT No.: PCT/JP00/01298

§ 371 (c)(1),
(2), (4) Date: Aug. 6, 2001

(87) PCT Pub. No.: WO00/52544

PCT Pub. Date: Sep. 8, 2000

(30) Foreign Application Priority Data

Mar. 4, 1999 (JP) .................................. 11/057663

(51) Int. Cl.
*B01L 3/02* (2006.01)

(52) U.S. Cl. ...................... 422/100; 422/102; 422/106; 137/391; 137/393; 137/395; 137/386; 141/198

(58) Field of Classification Search ................ 137/266, 137/44, 101.25, 87.02, 386, 158, 391, 393, 137/1.31, 403, 396, 395; 422/99–104, 106; 73/447; 417/125; 141/198, 39, 40, 44; *G01N 1/10, G01N 1/00, 1/14; G05D 9/12*
See application file for complete search history.

(56) References Cited

U.S. PATENT DOCUMENTS 2,798,228 A 7/1957 Boester 3,085,717 A * 4/1963 Anscherlik .................. 222/109

(Continued)

FOREIGN PATENT DOCUMENTS

| DE | 44 17 083 A1 | 11/1995 |
|---|---|---|
| EP | 0 410 273 A1 | 1/1991 |
| EP | 0 777 078 A1 | 6/1997 |
| JP | 6-98728 | 4/1994 |
| JP | 8-14177 | 1/1996 |
| JP | 8-101099 | 4/1996 |
| JP | 9-19690 | 1/1997 |
| JP | 9-44255 | 2/1997 |

OTHER PUBLICATIONS

Morozov et al., "Mechanical Detection of Interaction of Small Specific Ligands with Proteins and DNA in Cross-Linked Samples", Analytical Biochemistry, 201, pp. 68-79 (1992).

*Primary Examiner*—Brian R. Gordon
(74) *Attorney, Agent, or Firm*—Oliff & Berridge, PLC

(57) ABSTRACT

In a liquid treating equipment to maintain a small amount of liquid to a desired liquid level with constantly supplying an additional liquid into a small capacity vessel, a storage vessel 13 to store the small amount of liquid, an injection tube 16 to inject the small amount of liquid into the storage vessel 16, liquid supplying apparatus 23–25 to supply the small amount of liquid into the storage vessel through the injection tube, a flow path 15 of which one end is joined with the storage vessel, a discharge vessel 14, joined with the storage vessel 13 via the flow path, having a larger surface area than that of the storage vessel, a discharge tube 17 of which the discharging inlet is positioned at the same level position as a desired liquid level of the small amount of liquid in the storage vessel and liquid discharging apparatus 27–29 to discharge the liquid from the discharge vessel through the discharge tube are provided. Even though the liquid level in the discharge vessel is largely fluctuated, the liquid level in the storage vessel is almost never done.

18 Claims, 8 Drawing Sheets

U.S. PATENT DOCUMENTS

| | | | |
|---|---|---|---|
| 3,200,971 A * | 8/1965 | Trethewey | 414/148 |
| 3,208,468 A * | 9/1965 | Hansen | 137/266 |
| 3,725,258 A * | 4/1973 | Spector et al. | 210/604 |
| 3,909,205 A * | 9/1975 | Jones | 422/50 |
| 3,951,795 A * | 4/1976 | Doncer et al. | 210/709 |
| 4,029,473 A * | 6/1977 | Sharples | 422/100 |
| 4,108,768 A * | 8/1978 | Sebelik et al. | 210/705 |
| 4,123,365 A | 10/1978 | Middelbeek | |
| 4,191,208 A * | 3/1980 | Mylander | 137/393 |
| 4,466,740 A * | 8/1984 | Kano et al. | 356/246 |
| 4,545,801 A | 10/1985 | Miyajiri et al. | |
| 4,606,797 A * | 8/1986 | Taylor et al. | 205/567 |
| 4,725,367 A * | 2/1988 | McKim et al. | 210/793 |
| 4,728,440 A * | 3/1988 | van Kuijeren | 210/744 |
| 4,860,804 A * | 8/1989 | Yamaguchi et al. | 141/94 |
| 4,915,823 A * | 4/1990 | Hall | 210/95 |
| 5,017,241 A * | 5/1991 | Ryan | 134/22.12 |
| 5,043,283 A * | 8/1991 | Endo et al. | 123/684 |
| 5,061,450 A * | 10/1991 | Aoyagi | D6/421 |
| 5,061,453 A * | 10/1991 | Krippl et al. | 422/106 |
| 5,078,187 A * | 1/1992 | Sharp | 141/198 |
| 5,137,694 A * | 8/1992 | Copeland et al. | 422/106 |
| 5,140,527 A * | 8/1992 | Jones et al. | 702/27 |
| 5,154,835 A * | 10/1992 | DeMichael | 210/744 |
| 5,433,854 A * | 7/1995 | Dickerson | 210/620 |
| 5,435,910 A * | 7/1995 | Verret | 210/86 |
| 5,480,566 A * | 1/1996 | Strand | 210/772 |
| 5,482,368 A | 1/1996 | Nakamura et al. | |
| 5,560,826 A * | 10/1996 | Szereday et al. | 210/522 |
| 5,591,348 A * | 1/1997 | Felder et al. | 210/704 |
| 5,645,732 A * | 7/1997 | Daniels | 210/747 |
| 5,720,875 A * | 2/1998 | Stegall et al. | 210/108 |
| 5,733,776 A * | 3/1998 | Barngrover et al. | 435/286.5 |
| 5,746,911 A * | 5/1998 | Pank | 210/170 |
| 5,770,081 A * | 6/1998 | McKinney | 210/620 |
| 5,782,609 A | 7/1998 | Ikemoto et al. | |
| 5,829,491 A * | 11/1998 | Bennett | 141/59 |
| 5,830,355 A * | 11/1998 | Harris | 210/519 |
| 5,860,458 A * | 1/1999 | Benjey et al. | 141/59 |
| 5,866,825 A * | 2/1999 | Moore et al. | 73/864.22 |
| 5,871,647 A * | 2/1999 | Lord | 210/615 |
| 5,980,736 A * | 11/1999 | Putz et al. | 210/104 |
| 5,983,958 A * | 11/1999 | Bergsma et al. | 141/59 |
| 5,996,604 A * | 12/1999 | Doelle et al. | 137/1 |
| 6,015,496 A * | 1/2000 | Khudenko | 210/603 |
| 6,015,500 A * | 1/2000 | Zuk, Jr. | 210/767 |
| 6,099,722 A * | 8/2000 | Tittlebaum et al. | 210/86 |
| 6,132,620 A * | 10/2000 | Robinson et al. | 210/669 |
| 6,251,286 B1 * | 6/2001 | Gore | 210/744 |
| 6,475,444 B1 * | 11/2002 | Zimmermann et al. | 422/102 |
| 6,551,557 B1 * | 4/2003 | Rose et al. | 422/100 |
| 6,846,461 B2 * | 1/2005 | Feygin | 422/103 |
| 6,854,492 B2 * | 2/2005 | Benjey | 141/198 |
| 6,863,095 B2 * | 3/2005 | Osaki et al. | 141/44 |
| 2002/0136666 A1 * | 9/2002 | Astle | 422/100 |
| 2004/0031540 A1 * | 2/2004 | Peterson | 141/198 |
| 2004/0074558 A1 * | 4/2004 | Preisser et al. | 141/59 |

* cited by examiner

LIQUID TREATING EQUIPMENT INCLUDING A STORAGE VESSEL AND A DISCHARGE VESSEL

BACKGROUND

1. Technical Field

This invention relates to a liquid treating equipment which injects a liquid into a vessel through an injection tube by a liquid supplying means and discharges, in order to maintain the liquid level in the vessel to a given value, the excess amount of the liquid through an injection tube with a suction inlet provided at the same level of the vessel as the liquid level by a liquid discharging means.

2. Background Art

Small capacity vessels are employed in a variety of fields such as chemical analysis, pharmaceutical analysis and medical care. That is, in such a field as biochemical, molecular biology and medical cure, since it is often difficult to generate and extract-purify a substance to be used in a chemical reaction, the substance must be often obtained through its chemical reaction of a small amount of liquid in a small capacity reaction vessel. Normally, as liquid chromatography, the small capacity vessel has a built-in or continuously joined injection port and discharge port thereto provided above a level position of the vessel, and a liquid is injected into the vessel from the injection port and discharged from the discharge portion.

The above conventional small capacity vessel is perfectly sealed. However, such a sealed structure restricts the function of the small capacity vessel. For example, it is difficult to transform and move a transducer to transmit the condition of the inside of the vessel to outside. If possible, a very complicated mechanism is required.

Recently, for operating such a transducer freely, a top-opened vessel is employed. Attention must be paid to the evaporation of the liquid if the top-opened vessel is employed for treating the liquid. If the top-opened vessel has a top opening with an area of 10 $mm^2$ and below and a depth of 3 mm in order to fill a liquid of 10–15 µl in, the degree of the evaporation is remarkably developed, resulting in the change of the volume and concentration of the liquid and thus, the remarkable change in its hydrogen-ion concentration (pH). These parameters influences the analytic results and experimental results of the liquid.

To iron out the above matter, a liquid treating equipment to supply an additional liquid constantly during the chemical reaction or the experiment of the liquid is employed. In the liquid treating equipment, the additional liquid is injected constantly into the top-opened vessel through an injection tube in order to replenish the evaporated amount of the liquid. In using such a liquid treating equipment, since the fluctuation of the liquid level of the liquid to be filled in influences largely the experiment or the chemical reaction of the liquid, it is required to maintain the liquid level.

Generally, for maintaining the liquid level with injecting the additional liquid constantly, an excess amount of the liquid is overflown out of the vessel, but if the small capacity vessel with its small opening is employed, its liquid level is risen by its surface tension when the additional liquid is injected. Then, if the liquid level is risen beyond a given level, the surface tension is broken and thus, the excess amount of the liquid is overflown. In the case of using the small capacity vessel, such a process is repeated, so that the liquid level is largely fluctuated and the liquid level can not be maintained to a desired level. Therefore, for repressing the fluctuation of the liquid level, a discharge tube is provided at the desired liquid level position of the vessel, and the excess amount of the liquid beyond the desired liquid level is discharged out of the discharge tube.

In a liquid treating equipment having an injection tube and a discharge tube to inject an additional liquid constantly and discharge the excess amount of the liquid as its liquid level is overflown in order to maintain the liquid level constant, if the equipment has a small capacity vessel with an opening of several square millimeter, it can not have its desired liquid level due to large fluctuation.

FIG. 1 shows a fluctuation state of a liquid level in a conventional liquid treating equipment. A vessel 1 is composed of a base block with a concave portion therein. Then, an injection tube 3 is provided so that its injecting inlet can be positioned at a lower level position than a desired liquid level, and a discharge tube 4 is provided so that its discharging inlet can be positioned at the same level position as that of the desired liquid level.

An upper left view in FIG. 1 shows the state in which the risen liquid level through the injection of the additional liquid into the vessel 1 from the injection tube 3 is just contacted to the discharging inlet of the discharge tube. In the state, the liquid level is almost equal to the desired liquid level L despite of the liquid level wave. If an additional liquid is injected into the vessel in the state as shown in the upper left view in FIG. 1, the excess amount of the liquid in the vessel is discharged through the discharge tube 4. In this case, as shown in a central view in FIG. 1, if the liquid level comes down below the desired level, the liquid is discharged to some degree, so that the liquid level waves largely. Thereafter, as shown in upper right view in FIG. 1, the liquid level is discontinued to the discharging inlet of the discharge tube 4 because it is situated at a lower position than the desired liquid level L. Subsequently, if an additional liquid is injected through the injection tube 3, the liquid level is risen and has the initial state as shown in the upper left view. Since the above process is repeated, the liquid level is fluctuated largely.

Although the conventional liquid treating equipment has the injection tube 3 and the discharge tube 4, the liquid level fluctuates largely and thus, can not have the desired liquid level. It is considered that the liquid level fluctuation results from two phenomena as follow.

First of all, it is considered that a pump, as the additional liquid is injected by a pump, beats the liquid level through the beaten additional liquid. An air pump as a commercially available pump beats the liquid level inevitably, and fluctuates the liquid level largely. Moreover, a positive displacement pump in which its plunger moves in its cylinder back and forth may be employed as a smaller beat liquid pump, but has difficulty in repressing the liquid level fluctuation if the vessel 1 has a small capacity of µl order.

Second, in the above state, the liquid in the vessel is contacted to an air surrounding the vessel. At the interface between the liquid and air with the respective different phases, the liquid tends to have its minimum surface area due to their different agglutination, and the liquid level is risen in cone around the discharge tube by capillary phenomenon. That is, the liquid level has a depressed shape as a whole and a conical rising shape around the discharge tube, so that the liquid level is fluctuated largely.

Due to the above two phenomena, the liquid level is partially risen around the discharge tube and discharged as before even though the bottom surface of the depressed liquid level comes down below the discharging inlet of the discharge tube. If the absorption force for the discharge tube due to the surface tensile of the liquid becomes smaller than the weight of a part of the liquid around the discharge tube, the part of liquid level is separated from the discharge inlet of the discharge tube, and thus, falls down. The liquid level is risen through the shutdown of the liquid discharge and the injection of an additional liquid from the injection tube to contact the discharging inlet of the discharge tube. As the liquid has a smaller surface area, it has a largely curved liquid level, so that in the case of employing a small capacity vessel, the liquid level is remarkably fluctuated.

As mentioned above, in the conventional liquid treating equipment having the small capacity vessel, the beat of the additional injected liquid from the pump and the surface tensile and capillary phenomenon of the liquid fluctuate the liquid level largely not to maintain the liquid level to the desired level. The largely fluctuated liquid level changes the dipped length of a probe of a transducer in the liquid, resulting in the analytic error and measurement error of the liquid.

In view of the above matter, it is an object of the present invention to provide a liquid treating equipment, through the mitigation for the above conventional matter, which can maintain a liquid level of a liquid filled in a vessel to a desired level even though the injected liquid is beaten, and thus, make as small as possible errors in the analytic results or measurement results of the liquid due to the fluctuation of the liquid level.

SUMMARY

This invention relates to a liquid treating equipment comprising a storage vessel to store a liquid, a injection tube to inject the liquid into the storage vessel, a liquid supplying means to supply the liquid into the storage vessel through the injection tube, a discharging vessel joined with the storage vessel via a flow path, a discharge tube of which the discharging inlet is positioned at the almost same level position as a desired liquid level of the liquid to be injected into the storage vessel, and a liquid discharging means to discharge the liquid from the discharging vessel through the discharge tube.

In the liquid treating equipment of the present invention, although the liquid level in the discharge vessel is largely fluctuated as in the above conventional equipment, the liquid level in the storage vessel is not done, and maintained to almost a desired level. That is, according to the liquid treating equipment of the present invention, the fluctuation range in the liquid level of the liquid in the storage vessel can be reduced below about 25 μm, which is sufficiently small compared with the errors in the analytic results and chemical reaction conditions for the liquid. As a result, the precision in the analytic results and chemical reaction conditions can be enhanced. Such an enhancement becomes conspicuous when the surface area of the discharge vessel is larger than that of the storage vessel and the depth of the discharge vessel is shallower than that of the storage vessel.

In a preferred embodiment of the liquid treating equipment of the present invention, the storage vessel, the flow path and the discharge vessel are integrally formed at a surface of a single base material. For example, the storage vessel and the discharge vessel are formed at a surface of a base material made of an acrylic board, and the flow path to join the storage vessel and the discharge vessel is formed canaliculately at the same surface. In this case, at least the surfaces of the storage vessel and the discharge vessel may be hydrophilic-treated. The hydrophilic surfaces of the storage vessel and the discharge vessel can repress the liquid rising along them, and thus, the fluctuation of the liquid level can be more repressed.

Moreover, in the present invention, it is desired that the outlet of the injection tube is provided at a lower level position of the storage vessel than the desired level of the liquid injected therein. In this case, the liquid level almost never fluctuates by the shock of the injected additional liquid in the storage vessel, so that the fluctuation of the liquid level in the storage vessel can be more repressed.

For flowing the liquid to the discharge vessel from the storage vessel through the flow path, it is required that at least a part of the flow path is situated at a lower level position than the desired level of the liquid in the storage vessel. An opened canaliculate flow path having a bottom surface situated at a lower level position than the desired liquid level of the liquid to be filled in the storage vessel and an tubular flow path positioned at a lower level position than the desired liquid level in the storage vessel can be satisfy the above requirement.

Furthermore, in the liquid treating equipment, it is desired that the flow rate of the liquid discharging means is sufficiently larger than that of the liquid injecting means. In this case, if the liquid level of the liquid in the storage vessel is increased over the desired level, it can be lowered immediately.

Each of the above liquid supplying means and liquid discharging means may be composed of an air pump mechanism including a rotary air pump and a liquid tank connected to the air pump. Moreover, each of the liquid supplying means and the liquid discharging means may be composed of a positive displacement pump having a plunger to move back and forth in a cylinder thereof. In this case, the plunger of the positive displacement pump is preferably driven by a pulse motor. The positive displacement pump enables the fluctuation in the liquid level of the liquid to filled in the storage vessel to be more reduced.

BRIEF DESCRIPTION OF THE DRAWINGS

For better understanding of the present invention, reference is made to the attached drawings, wherein.

DETAILED DESCRIPTION OF EMBODIMENTS

Figure 1:
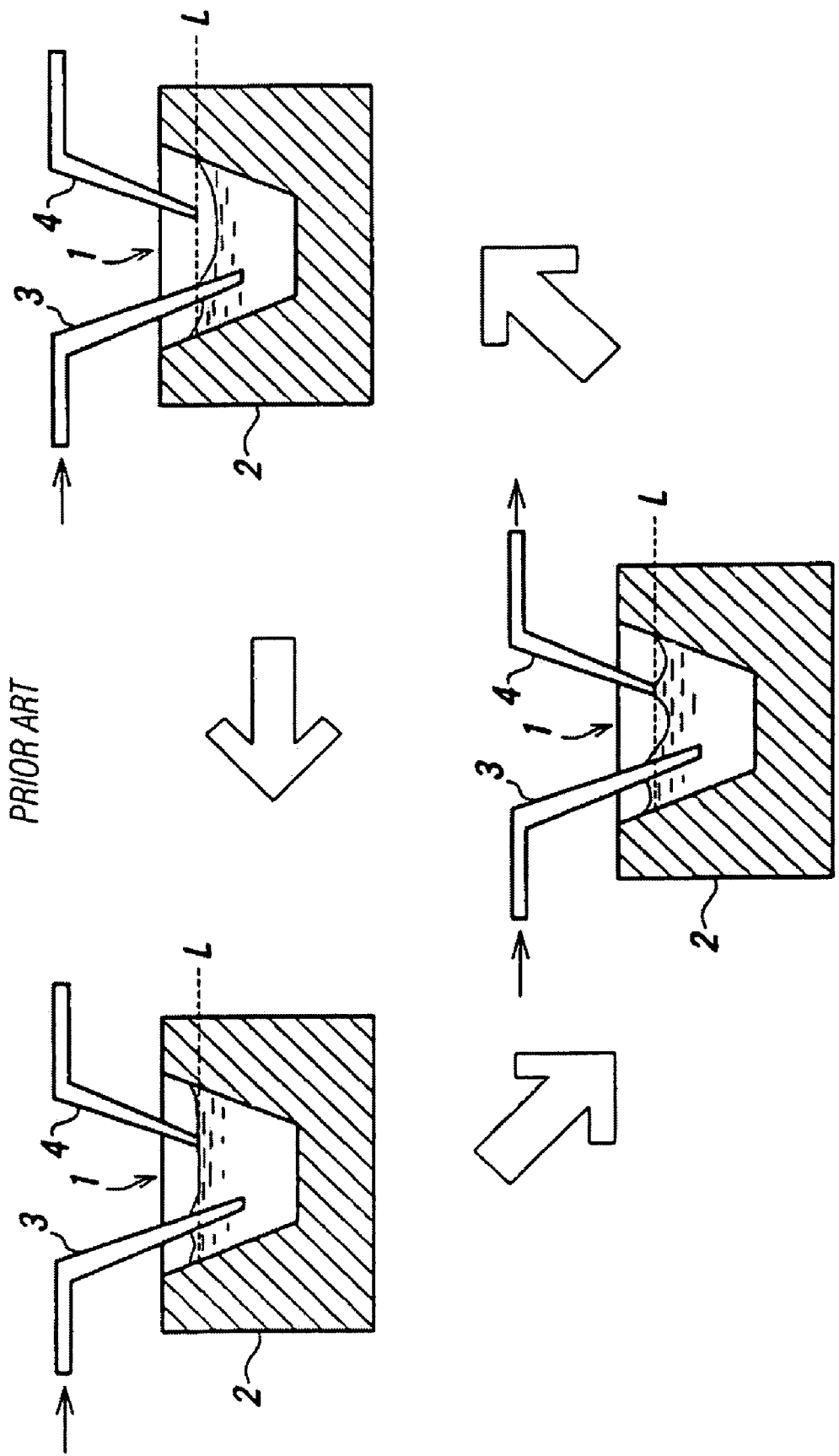
FIG. 1 is a diagrammatic view showing a fluctuation state of a liquid level in a vessel of a conventional liquid treating equipment.
Figure 2:
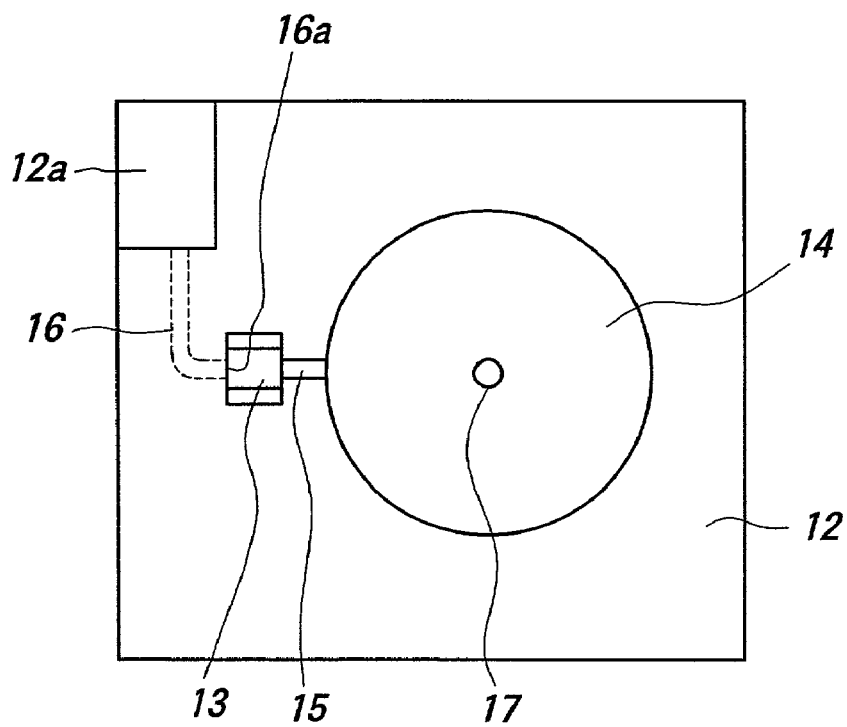
FIGS. 2 and 3 are a plan view and a cross sectional view showing a liquid holding unit in the liquid treating equipment of the present invention, respectively.
Figure 3:
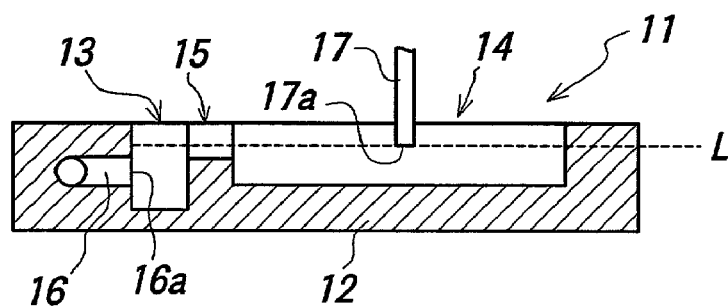

FIGS. 2 and 3 are a plan view and a cross sectional view entirely showing a liquid holding unit in the liquid treating equipment of the present invention, respectively. In this embodiment, a liquid holding unit 11 has a base material 12 made of an acrylic board, a small capacity storage vessel 13, a wide discharge vessel 14 and a flow bath 15 to join the storage vessel and the discharge vessel which are integrally formed on a main surface of the base material. In this case, it is preferable to hydrophilic-treat at least the inner surfaces of the storage vessel 13 and the discharge vessel 14.

In this embodiment, an injection tube 16 to supply a liquid in the storage vessel 13 is integrally formed in the base material 12, but may be provided separated from the liquid holding unit 11. Moreover, in this embodiment, the discharge vessel 14 has a circular surface shape, and a discharge tube 17 is provided at the center of the discharge vessel. The discharging inlet 17a of the discharge tube 17 is positioned at the same level position of the storage vessel 13 as a desired liquid level L, according to the present invention. Moreover, the injecting inlet 16a, joined with the storage vessel 13, of the injection tube 16 is positioned at a lower level position than the desired liquid level L. The liquid holding equipment having the above-mentioned structure enables the liquid level fluctuation due to the supply shock of an additional liquid to the storage vessel 13 to be repressed.

Figure 4:
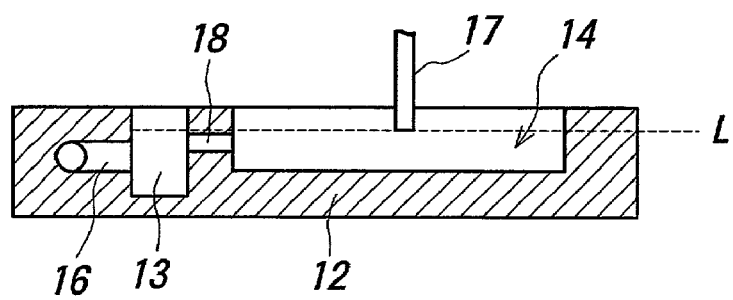
FIG. 4 is a cross sectional view showing another liquid holding unit in the liquid treating equipment of the present invention.

As shown in FIG. 3, in this embodiment, the flow path 15 to connect the storage vessel 13 and the discharge vessel 14 is so formed that it can have the top-opened canaliculate structure and its bottom surface can be positioned at a lower level position than the desired liquid level L. At least a part of the flow path 15 must be positioned at a lower level position than the desired liquid level L in the storage vessel 13 in order to flow the liquid in the storage vessel 13 to the discharge vessel 14, but the flow path 15 itself does not always have the top-opened structure as mentioned above and may have closed tube structure 18 as shown in FIG. 4.

The size of each part in the above liquid holding unit 11 are exemplified below, but needless to say, is not restricted to the exemplified size.

| | |
|---|---|
| Base material 11 | acrylic board size: 20 mm in width × 20 mm in length × 5 mm in thickness |
| Storage vessel 13 | top surface size: 3 mm in width × 2 mm in length bottom surface size: 1 mm in width × 2 mm in length depth: 3 mm capacity: 12 µl |
| Discharge vessel 14 | surface size: 10 mm in diameter depth: 2 mm capacity: 157 µl |
| Flow path 15 | sectional size: 1 mm × 1 mm: length: 2 mm |

Figure 5:
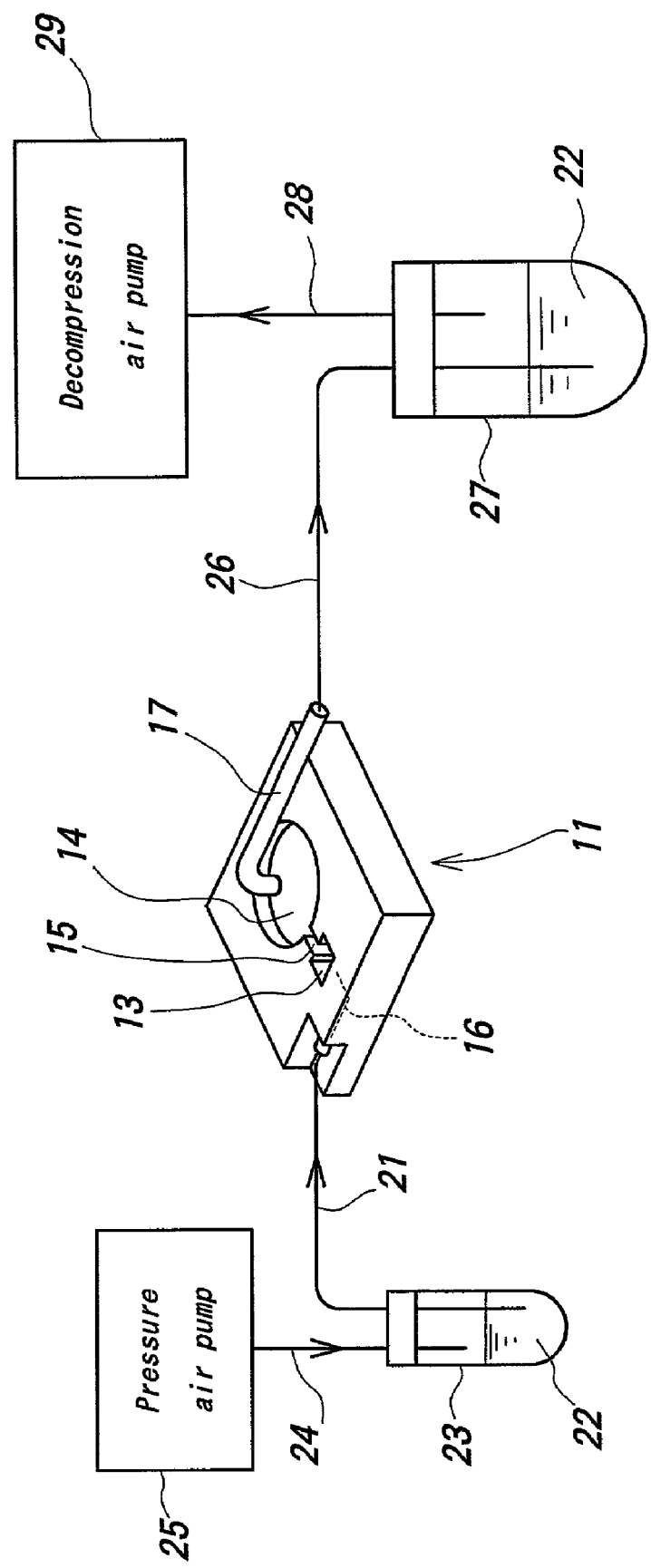
FIG. 5 is a diagrammatic view entirely showing an embodiment in the liquid treating equipment of the present invention.

FIG. 5 is a diagrammatic view entirely showing a liquid treating equipment according to the present invention having the liquid holding unit 11. The injection tube 16 of the liquid holding unit 11 is joined with a vessel 23 having a liquid 22 to be treated therein via a tube 21. The vessel 23 is joined with a pressure air pump 25 via a tube 24. In the vessel 23, the tip of the tube 21 is dipped into the liquid 22, and the tip of the tube 24 is positioned at a higher level position than the liquid level of the liquid 22. When the pressure air pump 25 is set off and thus, the interior of the vessel 23 is pressurized, the liquid 22 is supplied to the storage vessel 23 via the tube 21 and the injection tube 16. In this case, the pressure air pump 25 is maintained to the set-off condition during the above supplying process.

Moreover, the discharge tube 17 positioned at the center of the discharge vessel 14 is joined with a vessel 27 via a tube 26, and the vessel 27 is joined with a decompression air pump 29 via a tube 28. The liquid treated in the liquid treating unit 11 is suck and stored in the vessel 27. In the vessel 27, the tip of the tube 28 is positioned above the liquid level so as not to suck the treated liquid 22. The decompression air pump 29 is always operated during the liquid treatment.

Figure 6:
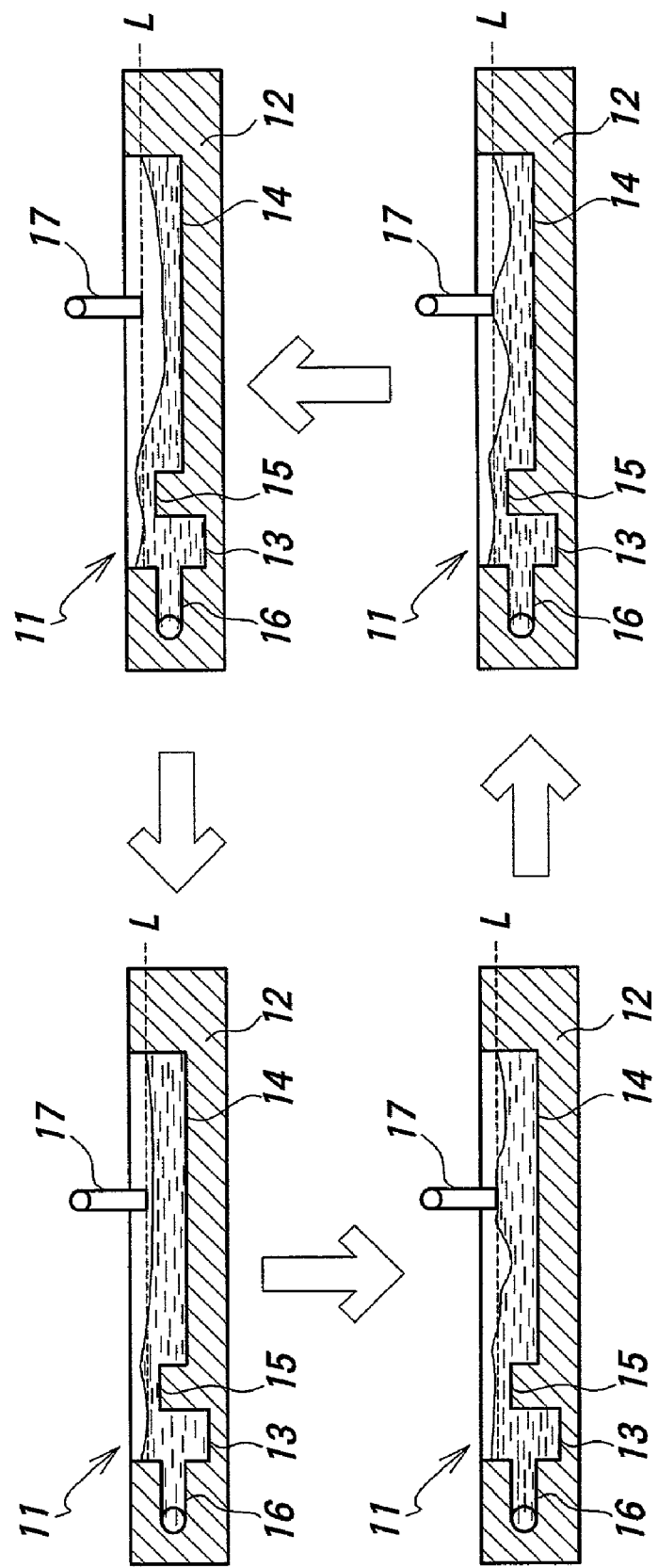
FIG. 6 is a diagrammatic view showing a fluctuation state of a liquid level in a liquid holding unit in the liquid treating equipment of the present invention.

FIG. 6 shows the state of the change in the liquid level in the storage vessel 13 and the discharge vessel 14 of the liquid holding unit according to the present invention. FIG. 6 shows the transition from the state in which the liquid level in the discharging vessel 14 is under the discharging inlet of the discharge tube 17 to the state in which the liquid level thereof is risen and contacted to the discharging inlet. When the liquid level is contacted to the discharging inlet of the discharge tube 17, the liquid in the discharging vessel is suck and discharged. In this case, the connection between the liquid and the discharging inlet is maintained as described above, and thus, the liquid is continued to be discharged as shown in the lower right view in FIG. 6. Therefore, the liquid level in the discharging vessel 14 is waved and thus, is decreased remarkably below the desired liquid level L. However, in the storage vessel 13, the liquid level is almost never fluctuated, and is maintained to the desired liquid level L.

Moreover, the liquid is still discharged through the discharge tube 17, and then, is separated from the discharging inlet as shown in the upper right view in FIG. 6. In this case, although the liquid level in the discharge vessel 14 is deviated largely from the desired liquid level L, the liquid level in the storage vessel 13 is maintained almost to the desired liquid level. The liquid level in the storage vessel 13 is increased as an additional liquid is supplied, and thus, has the level as shown in the upper left view in FIG. 6, again. Thereafter, the steps shown in the lower left view, the lower and upper right views in FIG. 6 are repeated. In the above repeated process, although the liquid level in the discharging vessel is conspicuously fluctuated, the liquid level in the storage vessel is almost never done and is maintained to the desired liquid level L.

When the liquid levels in the storage vessel 13 and the discharge vessel 14 of the liquid treating equipment of the present invention were measured, the amplitudes in the antinodes of the liquid levels in the discharge vessel and the storage vessel, that is, the distances between the minimum liquid levels and the maximum liquid levels at the centers of the discharge vessel and the storage vessel were about 0.2 mm and about 20 µm, respectively. As a result, the liquid level fluctuation in the storage vessel is much smaller than that in the discharge vessel. Therefore, the above liquid level fluctuation in the storage vessel 13 is negligible in the analysis and measurement for the liquid therein.

Figure 7:
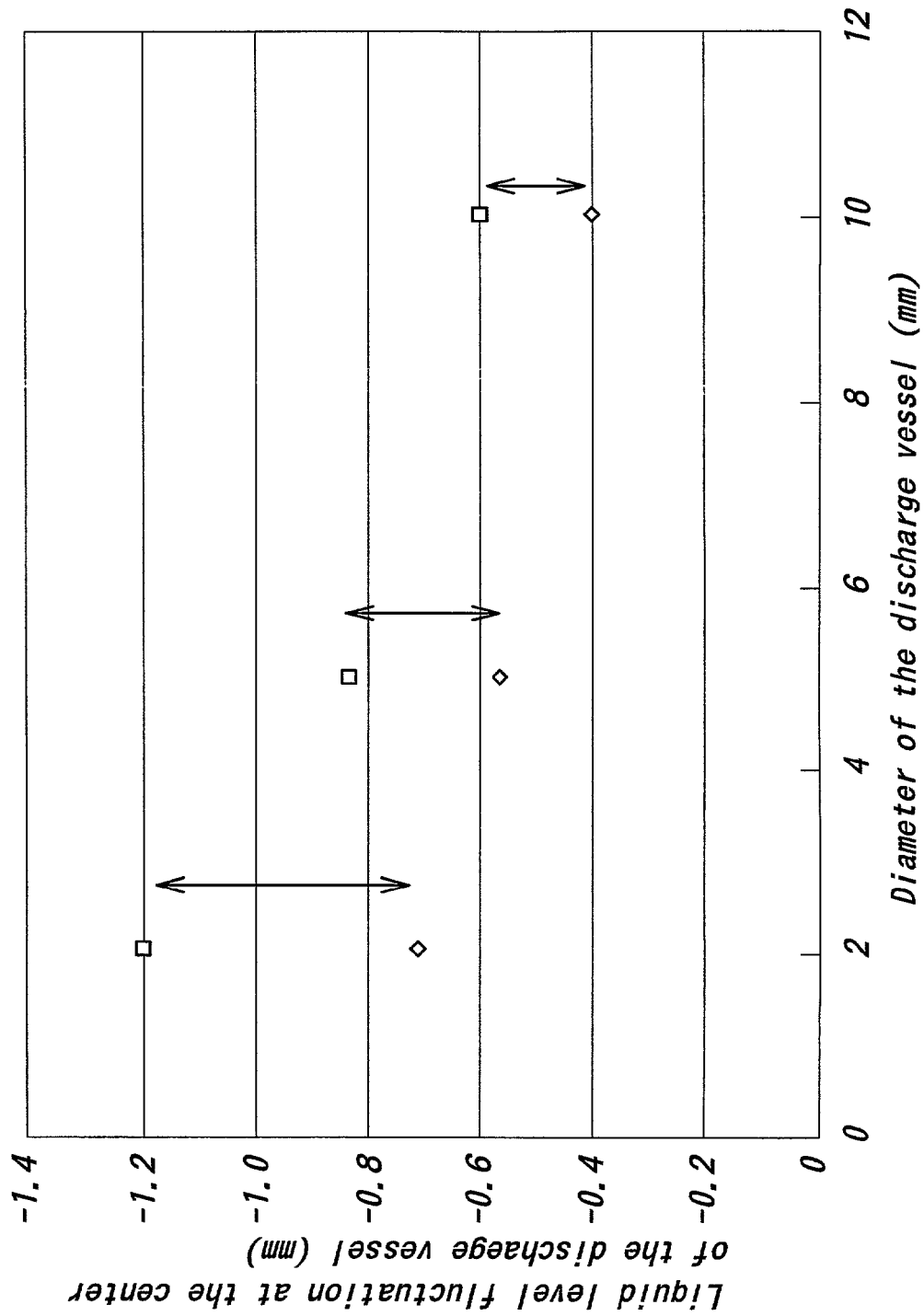
FIG. 7 shows graphs in liquid level fluctuation when the diameter of a discharge vessel of a liquid holding unit in the liquid treating equipment of the present invention is varied.

FIG. 7 shows the measurement results of the liquid level fluctuation in the discharge vessel 14 as the diameter thereof is varied. That is, the liquid level fluctuation was measured for the discharge vessels having diameters of 10 mm, 5 mm and 2 mm. The vertical axis in FIG. 7 designates the liquid level position in the discharge vessel to the one in the storage vessel, and the liquid level fluctuation in the discharge vessel can be represented by the distance between the maximum liquid level and the minimum liquid level. Through the above experiment, the liquid level fluctuation of almost 0.2 mm in the discharge vessel 14 enables the liquid level fluctuation in the storage vessel 13 to be reduced to a fluctuation value below a range of 20–30 µm.

In this invention, the liquid level fluctuation in the storage vessel 14 can be repressed through the liquid treating equipment having the discharge vessel 14 joined with the storage vessel 13, compared with the one not having the discharge vessel. Moreover, the discharge vessel having a surface area twice or over as large as that of the storage vessel enables the liquid level fluctuation in the storage vessel to be much reduced to a fluctuation value below 50 µm. Therefore, it is desired that the discharge vessel 14 has a surface area twice or over as large as that of the storage vessel 13.

Figure 8:
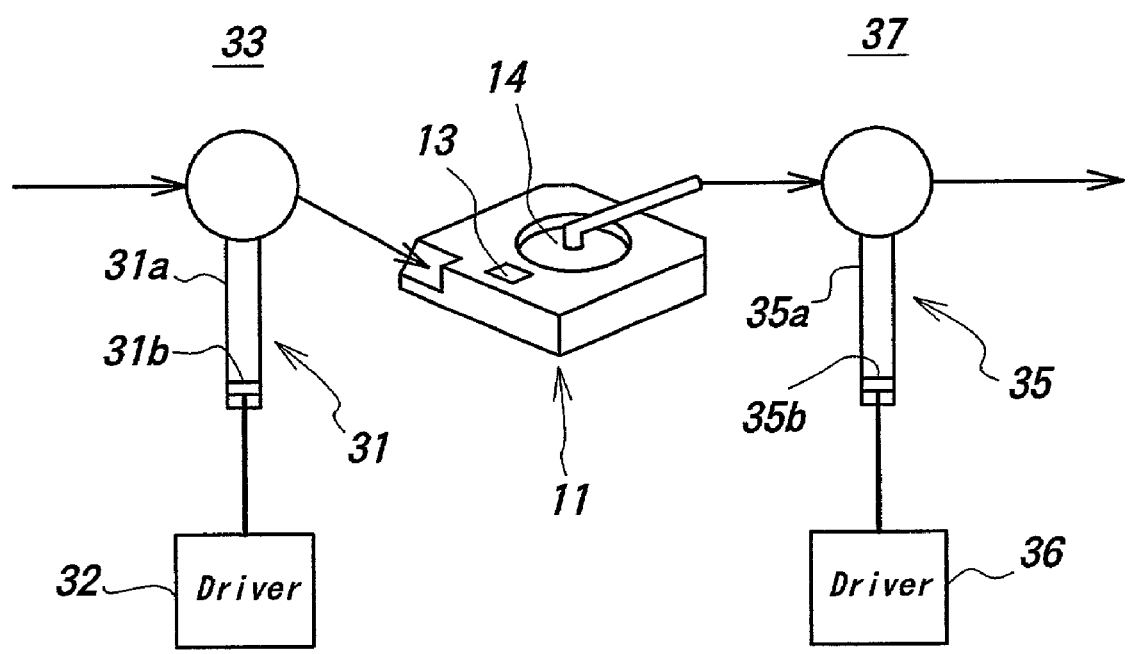
FIG. 8 is a diagrammatic view showing another embodiment in the liquid treating equipment of the present invention.

FIG. 8 is a diagrammatic view showing another embodiment in the liquid treating equipment of the present invention. In the embodiment shown in FIG. 5, the air pump mechanism having the vessel 23 of which the output is joined with the storage vessel 13 of the liquid holding unit 11 and the pressure air pump 25 joined with the input of the vessel 23 is employed as the liquid supplying means, and the peristatic type or the air pump type mechanism having the vessel 27 of which the input is joined with the discharge vessel 14 of the liquid holding unit 11 and the decompression air pump 29 joined with the output of the vessel 27 is employed as the liquid discharging means. However, the air pumps 25 and 29 are composed of rotary pumps which bring about their beats by nature, and thus, beats additional liquids to be supplied in and be discharge from the liquid holding unit 11. As a result, the liquid level suffers from the beats. On the contrary, in the embodiment shown in FIG. 8, a positive displacement pump mechanism having a cylindrical type or a positive displacement type pump 31 in which its plunger 31b moves back and forth in its cylinder 31a and a plunger driver 32 with a pulse motor is employed as the liquid supplying means, and a syringe or a positive displacement pump mechanism 37 having a positive displacement pump 35 in which its plunger 35b moves back and forth in its cylinder 35a and a plunger driver 36 with a pulse motor is employed as the liquid discharging means.

Since the positive displacement type pump mechanisms 33 and 37 do not bring about their beat by nature, compared with the above air pump mechanism, the liquid level fluctuation can be much reduced than in the above case shown in FIG. 5. In this case, it is desired that the plunger 31b of the positive displacement pump 31 in the liquid supplying side is operated, synchronized with the plunger 35b of the positive displacement pump 35 in the liquid discharging side.

Figure 9A:
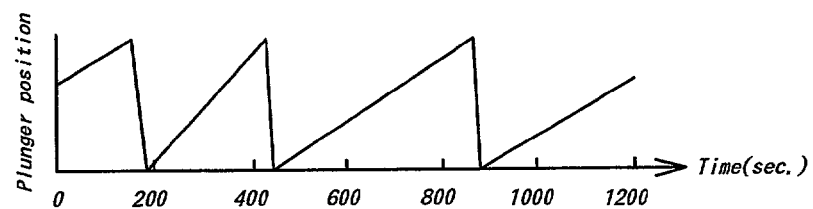
FIGS. 9A–9C are graphs showing the operation process of the liquid treating equipment shown in FIG. 8.
Figure 9B:
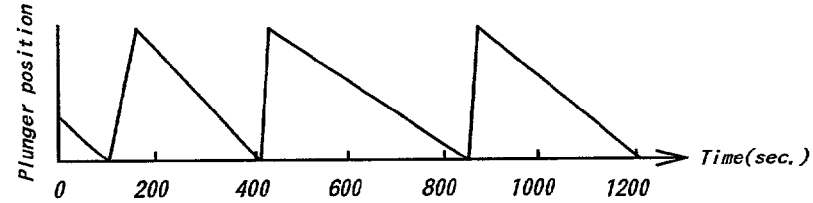
Figure 9C:
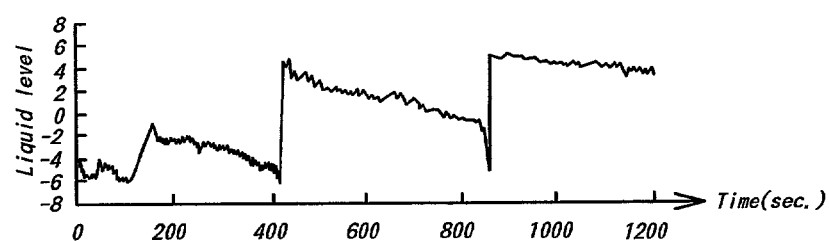

FIGS. 9A and 9B show the plunger displacements in the positive displacement pumps 31 and 35, and FIG. 9C shows the liquid level fluctuation in the storage vessel 13 in arbitrary scale. During a long time of 400 seconds, the liquid level is fluctuated, but its fluctuation degree is very small, so that it does not influence the liquid analysis. Moreover, the fluctuation in a moment of time is almost 1–10 µm, which is very small. Then, the liquid level is remarkably fluctuated as the movement direction of the plungers is reversed, which results from the difficulty in the perfect synchronization between the plungers 31b and 35b due to the characteristic fluctuation in the pulse motors. However, in the liquid analysis, after an additional liquid is supplied and the analyzed liquid is discharged, the successive liquid analysis is performed. Therefore, the liquid analysis is not almost influenced by the large liquid level fluctuation at the reverse of the movement direction of the plungers. However, the liquid level fluctuation in the liquid treating equipment having the liquid holding unit according to the present invention is substantially smaller than that in the one not having the liquid holding unit. Therefore, even the liquid level fluctuation may be negligible for some uses.

Next, the experiment to investigate the liquid level fluctuation will be described when the area of the discharge vessel is varied. Discharge vessels having diameters of 2 mm, 5 mm and 10 mm are prepared as the discharge vessel 14. The storage vessel 13 has a rectangular size of 3 mm×2 mm. Therefore, the ratio of the area of the discharge vessel 14 to the area of the storage vessel 13 is almost ½, 3 or 13. Moreover, the capacities of the positive displacement vessels 31 and 35 are 1000 µl, respectively, and the flow rate is 25 µl/min (1 stroke per 20 minutes).

Figure 10:
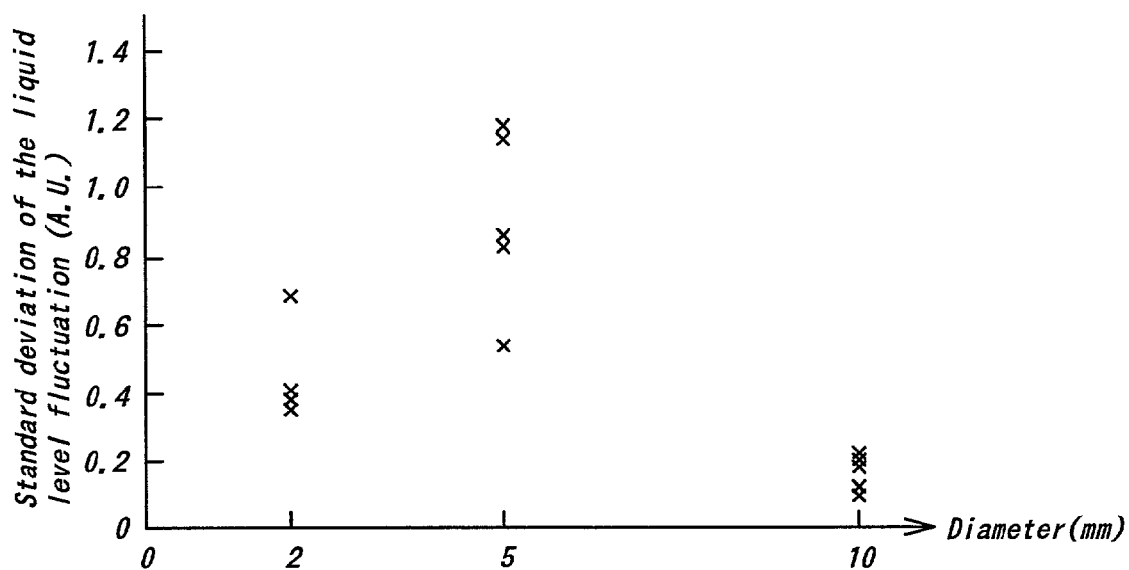
FIG. 10 shows graphs in the relation between the diameter of a discharge vessel of a liquid holding unit and a liquid level fluctuation.

FIG. 10 shows the standard deviation of the liquid level fluctuation in the storage vessel 13 as a vertical axis for the diameter of the discharge vessel 14 as an abscissa axis. The liquid level fluctuation is relatively large at the diameters of 2 mm and 5 mm of the discharge vessel 14, but is very small at the diameter of 10 mm.

Figure 11:
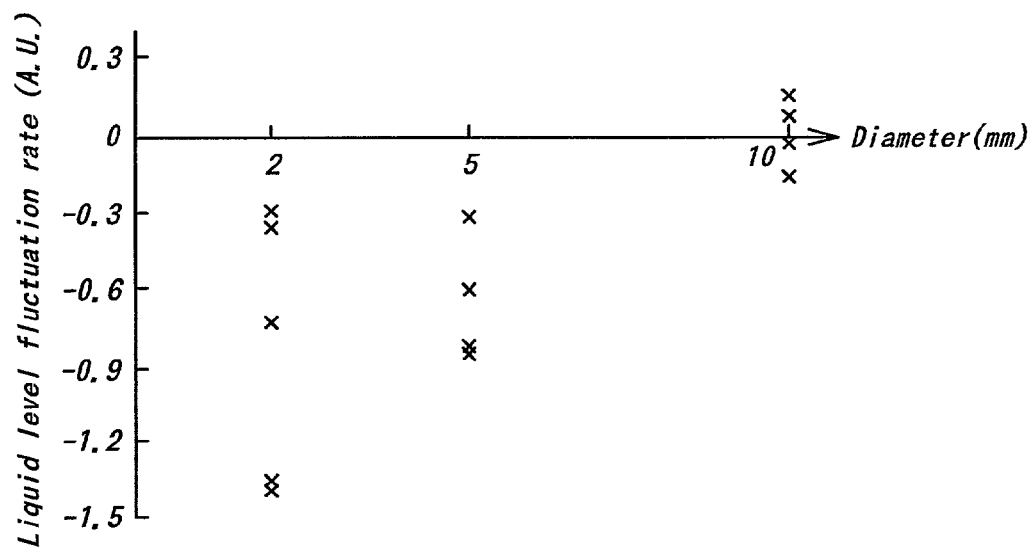
FIG. 11 shows graphs in the relation between the diameter of the discharge vessel of the liquid holding unit and the liquid fluctuation rate.

FIG. 11 shows the liquid level fluctuation rate per one minute as a vertical axis for the diameter of the discharge vessel as an abscissa axis. Apparent from FIG. 11, the liquid level fluctuation rate is relatively large at the diameters of 2 mm and 5 mm, but is very small at the diameter of 10 mm.

Apparent from the above experiment results, the discharge vessel 14 having the diameter of 10 mm enables the liquid level fluctuation in the storage vessel 13 to be reduced remarkably, so that it is preferable that the discharge vessel 14 has a surface area denary or over as large as that of the storage vessel 13.

The experimental results for the conventional liquid treating equipment and the liquid treating equipment of the present invention are listed in the following table. Herein, the liquid holding unit has the discharge vessel of the 10 mm diameter.

TABLE 1

| Unit type | Supplying pump | Discharging pump | Liquid level fluctuation |
| --- | --- | --- | --- |
| Conventional type | air pump | air pump | 13.2 |
| Present invention type | air pump | air pump | 1.2 |
| Present invention type | syringe type | air pump | 1.0 |
| Present invention type | syringe type | syringe type | 0.27 |

In the above table, the liquid level fluctuation is presented in arbitrary scale. As is apparent from the above table, the liquid holding unit can reduce the liquid level, compared with the conventional one. Particularly, the liquid holding unit having the positive displacement pumps with the respective plungers both in the liquid supplying side and the liquid discharging side shown in FIG. 8 has a liquid level fluctuation quarter as small as the one shown in FIG. 5.

Although the present invention was described in detail with reference to the above examples, this invention is not limited to the above disclosure and every kind of variation and modification may be made without departing from the scope of the present invention. For example, the storage vessel has the rectangular surface in the above embodiment, but may have a square, a circular or an elliptical surface.

Moreover, the discharge vessel has the circular surface, but may have an elliptical, a square or a rectangular surface. Moreover, in the above embodiment, the storage vessel, the discharge vessel and the flow path are integrally formed at the surface of the single base material, but some or all of them may be formed separately. Moreover, the discharging inlet of the discharge tube is positioned at the center of the discharge vessel, but may be done at a position away from the center thereof.

INDUSTRIAL APPLICABILITY

As mentioned above, the liquid treating equipment of the present invention has the discharge vessel, joined with the storage vessel through the flow path, to discharge the minute liquid, besides the storage vessel with the minute liquid therein, so can repress the liquid level fluctuation in the storage vessel regardless of the liquid level fluctuation in the discharge vessel. By setting the surface area of the discharge vessel to a twice or over value as large as that of the storage vessel, the liquid level fluctuation can be much repressed.

The invention claimed is:

1. Equipment comprising:
   a storage vessel storing a liquid and having a desired liquid level;
   an injection tube to inject the liquid into the storage vessel;
   a liquid supplying means connected to the injection tube to supply the liquid into the storage vessel through the injection tube;
   a discharging vessel having a desired liquid level and connected to the storage vessel via a flow path, wherein the desired liquid levels of the storage vessel and the discharging vessel are equal and the flow path is at a lower depth than the desired liquid level, and wherein the discharge vessel and storage vessel are horizontally disposed to each other;
   a discharge tube including a discharge inlet mounted above the discharging vessel so that the discharge inlet opens therein in a configuration where a cross section of the inlet is planar with a desired liquid level in the discharging vessel; and
   a means for maintaining the liquid at the desired liquid level in the discharging vessel and the storage vessel, wherein the means for maintaining the desired liquid level comprises the liquid supplying means and a liquid discharging means connected to the discharge tube to discharge the liquid from the discharging vessel through the discharge tube.

2. The equipment as defined in claim 1, wherein the discharge vessel has a larger surface area than that of the storage vessel.

3. The equipment as defined in claim 2, wherein the discharge vessel has a surface area twice or over as large as that of the storage vessel.

4. The equipment as defined in claim 3, wherein the discharge vessel has a surface area denary or over as large as that of the storage vessel.

5. The equipment as defined in claim 1, wherein the discharge vessel has a depth smaller than that of the storage vessel.

6. The equipment as defined in claim 1, wherein an injecting inlet of the injection tube is positioned at a lower level position than the desired liquid level in the storage vessel.

7. The equipment as defined in claim 1, wherein the flow path has an opened canaliculate shape of which at least part of a bottom surface of the flow path is situated at a lower level position than the desired liquid level in the storage vessel.

8. The equipment as defined in claim 1, wherein the flow path has a tubular shape of which at least a part of a bottom surface of the flow path is situated at a lower level position than the desired liquid level in the storage vessel.

9. The equipment as defined in claim 1, wherein the liquid discharging means has a sufficient flow rate larger than that of the liquid supplying means.

10. The equipment as defined in claim 1, wherein the storage vessel, the flow path and the discharging vessel are integrally formed in a single base material.

11. The equipment as defined in claim 10, wherein the base material is composed of an acrylic board.

12. The equipment as defined in claim 10, wherein at least the surfaces of the storage vessel, the flow path and the discharge vessel are hydrophilic-treated.

13. The equipment as defined in claim 1, wherein the liquid supplying means and the liquid discharging means are composed of air pump mechanisms, respectively.

14. The equipment as defined in claim 13, wherein each of the air pump mechanisms comprises a rotary air pump and a liquid tank communicated with the rotary air pump.

15. The equipment as defined in claim 1, wherein the liquid supplying means and the liquid discharging means are composed of positive displacement pumps having their plunger moving back and forth in their cylinders, respectively.

16. The equipment as defined in claim 15, wherein each of the plungers of the positive displacement pumps is driven by a pulse motor.

17. Equipment comprising:
    a storage vessel storing a liquid and having a desired liquid level;
    an injection tube to inject the liquid into the storage vessel;
    a liquid supplying means connected to the injection tube to supply the liquid into the storage vessel through the injection tube;
    a discharging vessel having a desired liquid level and joined with the storage vessel via a flow path, wherein the desired liquid levels of the storage vessel and the discharging vessel are equal and the flow path is at a lower depth than the desired liquid level;
    a discharge tube including a discharging inlet mounted above the discharging vessel so that the discharging inlet opens therein in a configuration where a cross section of the inlet is planar with a desired liquid level in the discharging vessel; and
    a means for maintaining the liquid at the desired liquid level in the discharging vessel and the storage vessel, wherein the means for maintaining the desired liquid level comprises the liquid supplying means and a liquid discharging means connected to the discharge tube to discharge the liquid from the discharging vessel through the discharge tube, wherein the discharging inlet of the discharge tube is positioned in a central region from all sides of the discharge vessel.

18. The equipment as defined in claim 17, wherein the discharging inlet of the discharge tube is positioned at a center axis of the discharge vessel, wherein the center axis is in a vertical direction.

* * * * *